United States Patent [19]

Covelli et al.

[11] Patent Number: 5,073,581
[45] Date of Patent: Dec. 17, 1991

[54] SPINNABLE DOPES FOR MAKING ORIENTED, SHAPED ARTICLES OF LYOTROPIC POLYSACCHARIDE/THERMALLY-CONSOLIDATABLE POLYMER BLENDS

[75] Inventors: Carmen A. Covelli, Wilmington; E. Renee Perusich, Newark, both of Del.

[73] Assignee: E. I. Du Pont de Nemours and Company, Wilmington, Del.

[21] Appl. No.: 665,757

[22] Filed: Mar. 7, 1991

Related U.S. Application Data

[62] Division of Ser. No. 337,504, Apr. 13, 1989, Pat. No. 5,000,898.

[51] Int. Cl.$^5$ .......................... C08L 1/00; C08L 1/14; C08L 1/12
[52] U.S. Cl. .......................... 524/35; 524/36; 524/37; 524/38; 524/39; 524/40; 524/47; 524/55
[58] Field of Search .................. 524/35, 36, 47, 55, 524/10, 14, 41, 38, 39, 40, 37

[56] References Cited

U.S. PATENT DOCUMENTS

| | | | |
|---|---|---|---|
| 3,767,756 | 10/1973 | Blades | 264/184 |
| 3,869,429 | 3/1975 | Blades | 528/341 |
| 3,874,155 | 4/1975 | Knopka | 524/34 |
| 4,059,546 | 11/1977 | Knopka | 524/34 |
| 4,228,218 | 10/1980 | Takayanagi | 525/58 |
| 4,340,559 | 7/1982 | Yang | 264/181 |
| 4,464,323 | 8/1984 | O'Brien | 264/187 |
| 4,631,318 | 12/1986 | Hwang | 525/432 |
| 4,725,394 | 2/1988 | O'Brien | 264/187 |
| 4,810,735 | 3/1989 | Uy | 524/157 |

FOREIGN PATENT DOCUMENTS 57-183420 11/1982 Japan .
59-163418 9/1984 Japan .
2195672A 4/1988 United Kingdom .

Primary Examiner—Nathan M. Nutter

[57] ABSTRACT

Spinnable dopes containing fiber-forming polymers being at least about 55% and less than about 80% lyotropic polysaccharide and at least about 20 percent and less than about 45% thermally-consolidatable polymer and a process for making oriented, shaped articles of lyotropic polysaccharide/thermally-consolidatable polymer blends by orienting the dopes and removing the solvent.

10 Claims, 3 Drawing Sheets

5 μm

5 μm

←→ 250 μm

SPINNABLE DOPES FOR MAKING ORIENTED, SHAPED ARTICLES OF LYOTROPIC POLYSACCHARIDE/THERMALLY-CONSOLIDATABLE POLYMER BLENDS

This application is a divisional of United States patent application, Ser. No. 07/337,504, filed Apr. 13, 1989 and now U.S. Pat. No. 5,000,898.

BACKGROUND OF THE INVENTION

The present invention relates to composite materials and more particularly relates to a process for making oriented, shaped articles including fibers and films of lyotropic polysaccharide/thermally-consolidatable polymer blends having composite utility.

High modulus fibers such as poly(p-phenylene terephthalamide) sold under the trademark Kevlar by E. I. du Pont de Nemours and Company are useful for incorporation into polymeric matrix materials to produce composites. For some types of composites with thermoplastic polymer matrices, it is desirable to coat the high modulus fiber with the matrix polymer to produce coated fiber known as "prepreg" which can be directly molded into a composite by the application of heat and pressure. However, good quality "prepregs" are difficult to produce since wetting the fiber with the matrix polymer is often difficult. Also these prepregs are expensive due to the separate process steps necessary to apply the matrix polymer coating.

SUMMARY OF THE INVENTION

In accordance with the invention, a process is provided for making thermally-consolidatable shaped articles containing a substantially continuous phase of lyotropic polysaccharide in the direction of orientation. The process includes forming under agitation a liquid solution of the lyotropic polysaccharide and a thermally-consolidatable polymer in a common solvent with the solution having a total fiber-forming polymer concentration sufficient that the solution is bi-phasic and has an anisotropic phase and an isotropic phase. At least about 55% and less than about 80% by weight of the fiber-forming polymers are lyotropic polysaccharide and at least about 20% and less than about 45% by weight of the fiber-forming polymers are the thermally-consolidatable polymer. The anisotropic and isotropic phases are interdispersed with the isotropic phase being present in domains having a size on the average of less than about 300 microns, preferably less than about 100 microns. The bi-phasic liquid solution is then subjected to process steps such as extrusion in which the anisotropic phase of said solution is oriented and the solvent is removed to produce oriented, shaped articles.

In accordance with a preferred form of the process, the lyotropic polysaccharide is cellulose triacetate having an inherent viscosity of at least about 5.0 dl/g.

In accordance with the invention, a spinnable dope of fiber-forming polymers in a common solvent is provided. At least about 55% of and less than about 80% by weight of the fiber-forming polymers are a lyotropic polysaccharide and at least about 20% and less than about 45% by weight of the fiber-forming polymers are at least one thermally-consolidatable polymer. The lyotropic polysaccharide and thermally-consolidatable polymers are dissolved in the common solvent to form a bi-phasic solution having an anisotropic phase and an isotropic phase. The anisotropic and isotropic phases are interdispersed with the isotropic phase being present in domains having a domain size of less than about 300 microns, preferably less than about 100 microns.

The spinnable dopes and process of the invention provide fibers, films and other shaped, oriented articles which, as spun, can be formed directly by the application of heat and pressure into novel consolidated parts.

DETAILED DESCRIPTION OF THE INVENTION

Figure 1:
FIG. 1 is a transmission electron micrograph at 9,000× of a cross-section of a fiber produced in accordance with a preferred form of the present invention.

The process of the invention produces oriented, shaped articles of the invention comprised of a blend of at least one lyotropic polysaccharide polymer and at least one thermally-consolidatable polymer. The term "lyotropic polysaccharide" is intended to refer to a class of polysaccharides with (1,4)-$\beta$-linkages in the backbone such as cellulose, cellulose derivatives, chitin and chitin derivatives which have a high persistence length and function as a "rigid rod" in solution. Thus, lyotropic polysaccharides are capable with an appropriate solvent of forming an anisotropic solution, i.e., microscopic domains of the solution are birefringent and a bulk sample of the solution depolarizes plane polarized light due to the alignment of polymer chains in the domains which causes the light transmission properties of the domains to vary with direction.

Representative lyotropic polysaccharides for use in this invention are cellulose and cellulose derivatives and chitin and chitin derivatives. Cellulose refers to poly-1,4-$\beta$-D-glucopyranose. Cellulose derivatives are obtained by substitution of the cellulose hydroxyls through reactions common to primary and secondary alcoholic groups such as esterification and etherification, e.g., cellulose derivatives include ethyl cellulose, hydroxypropyl cellulose, cellulose acetate, cellulose triacetate, cellulose acetate butyrate, and the like. Chitin refers to poly-N-acetyl-D-glucosamine. Though cellulose and chitin are found naturally with the $C_5$–$C_6$ bond in the D-configuration, the invention defined herein would be just as applicable to an L-form and is not intended to be limited to the D-form. Examples of chitin derivatives include chitin acetate which refers to poly-N-acetyl-O-acetyl-D-glucosamine, chitin acetate/formate which refers to poly-N-acetyl-O-acetyl-N-formyl-O-formyl-D-glucosamine, chitosan which is obtained by de-N-acetylation of chitin and refers to poly-D-glucosamine, and chitosan acetate/formate which refers to poly-N-formyl-N-acetyl-O-acetyl-O-formyl-D-glucosamine. Preferred is cellulose triacetate which is disclosed in U.S. Pat. Nos. 4,464,323 and 4,725,394, the disclosures of which are hereby incorporated by reference.

The oriented, shaped articles produced by the process of the invention include at least one thermally-consolidatable polymer. The term thermally-consolidatable polymer is intended to refer to any of a wide variety of polymers which can be consolidated with application of heat and pressure by mechanisms including melting and chemical reaction. Preferred for this purpose are thermoplastic polymers, particularly those known for use as a composite matrix. Thermoplastic polymers useful in this invention include polyarylates such as polyetherketoneketone polymers (PEKK), polyacrylonitrile (PAN), crystalline thermoplastic polyamides (e.g., poly(hexamethylene adipamide) and poly($\epsilon$-caproamide) and amorphous thermoplastic polyamides. Preferred for the practice of the invention are thermoplastic polyamides.

The process of the invention includes forming a biphasic solution (dope) of the lyotropic polysaccharide polymer and the thermally-consolidatable polymer in an appropriate solvent. The bi-phasic solution has an anisotropic phase containing primarily the lyotropic polysaccharide polymer and an isotropic phase containing primarily the thermally-consolidatable polymer. For the solution to be bi-phasic, it is necessary for the concentration of the fiber-forming polymers to be sufficiently high that the lyotropic polysaccharide forms an anisotropic phase which is a discrete phase separate from the isotropic phase containing the thermally-consolidatable polymer. However, the resulting solids concentration should be low enough in the solvent used that the lyotropic polysaccharide polymer does not precipitate out of solution.

The solvent employed to form the biphasic solution should be selected so that it can dissolve enough of the lyotropic polysaccharide to provide a solution of the lyotropic polysaccharide above its critical concentration (concentration at which the solution becomes anisotropic). It is recognized that both the molecular weight and pattern of substitution of polysaccharide polymers will probably determine their solubility in any particular solvent and also the concentrations at which optical anisotropy is observed. In addition, the solvent selected depends on the thermally-consolidatable polymer since it must serve as being a common solvent for the thermally-consolidatable polymer and single or mixed solvents may be necessary. In a preferred form of the invention employing cellulose triacetate and thermoplastic polyamides, a mixed solvent of trifluoroacetic acid and formic acid is used. The fiber-forming solids in the dope are made up of at least about 55 percent and less than about 80 percent by weight of the lyotropic polysaccharide and at about 20 percent and less than about 45 precent by weight of the thermally-consolidatable polymer. In general, it is necessary for the dope to have at least 55 percent and preferably greater than 60 percent by weight of the lyotropic polysaccharide in order to obtain spinning continuity and good tensile strength in the articles. Generally, less than about 20 percent of the thermally-consolidatable polymer makes it difficult to consolidate the articles to produce a composite.

In order to obtain articles in accordance with the invention in which the first polymer phase containing the lyotropic polysaccharide is substantially continuous in the direction of orientation as will be described hereinafter, it is necessary for the isotropic domains in the spin dope to be finely-divided in the blend, preferably less than about 300 microns, most preferably less than about 100 microns. The bi-phasic solutions thus appear to homogeneous to the unaided eye. While this can be achieved by adding the polymers simultaneously to the solution and mixing with strong agitation over a long period of time, it is preferable to first add the lyotropic polymer to the solvent and then subsequently add the thermally-consolidatable polymer. In order to prevent gross phase separation, is is usually necessary to continue agitation of the solution or to form into oriented, shaped articles shortly after the solution is formed.

In accordance with the process of the invention, the anisotropic phase of the biphasic solution is oriented and then the solvent is removed to produce oriented, shaped articles. A number of techniques can be used such as forming fibers by spinning or extruding the dope into films. Orientation of the anisotropic phase can be by applying shear forces to or elongational flow to the liquid solution. The techniques for solvent removal must be capable of removing the solvent from the high viscosity solutions (the solution viscosity is typically greater than 100 poise). Techniques which are suitable for this task are air-gap wet spinning and film extrusion processes where the solution passes through a spinneret or die into an air gap and subsequently into a coagulant bath where the solvent is removed from the blend. In general, fiber spinning and film extrusion processes useful for forming the lyotropic polysaccharide polymer into high tenacity fibers and films are useful for spinning the blend fibers in accordance with the present invention. Fibers of the invention can be produced by the method disclosed in U.S. Pat. Nos. 4,464,323 and 4,725,394, the disclosures of which are hereby incorporated by reference. Liquid crystalline solutions may revert to an isotropic state when heated above a certain critical temperature and optimum spinnability and fiber tensile properties are obtained only below this temperature.

In accordance with the process described in U.S. Pat. Nos. 4,464,323 and 4,725,394, for making fibers, dopes are extruded through spinnerets and the extruded dope is conducted into a coagulation bath through a noncoagulating fluid layer. While in the noncoagulating fluid layer, the extruded dope is stretched from as little as 1 to as much as 15 times its initial length (spin stretch factor). The fluid layer is generally air but can be any other inert gas or even liquid which is a noncoagulant for the dope. The noncoagulating fluid layer is generally from 0.1 to 10 centimeters in thickness.

The coagulation bath can be aqueous and ranges from pure water, or can be any non-aqueous coagulating liquid. Bath temperatures can range from freezing to below freezing. It is preferred that the temperature of the coagulation bath be kept below about $-10°$ C., to obtain fibers with the highest initial strength.

After the extruded dope has been conducted through the coagulation bath, the dope has coagulated into a fiber swollen with coagulant. The fiber should be thoroughly washed to remove salt and acid from the interior of the swollen fiber. Fiber-washing solutions can be pure water or they can be slightly alkaline. Washing solutions should be such that the liquid in the interior of the swollen fiber, after washing, should be essentially neutral.

The washed yarn can be dried by air drying or heating such as in an oven or by passing the wet yarn over multiple wraps on a pair of steam-heated rolls.

In oriented, shaped article made by the process of the invention, the lyotropic polymer makes up a first polymer phase of the articles and the thermally-consolidatable polymer is found within a second polymer phase. Characteristic of the first polymer phase is that it is at least substantially continuous in the direction of orientation of the articles when viewed at a magnification of 9000×. For a fiber in which the direction of orientation is longitudinal, this structure is visible in FIG. 2 which is a transmission electron micrograph (TEM) at 9000× of a longitudinal section of the fiber made with a preferred process in accordance with the invention. The first polymer phase appears to be lighter than the darker colored second polymer phase. "Continuous in the direction of orientation" and "longitudinally continuous" in the case of fibers is intended to indicate that fibrils of the lyotropic polysaccharide in the first polymer phase extend essentially continuously in the direction of orientation or along the length of the article when viewed at 9000×.

Preferably, the articles are highly oriented. For fibers of the invention, the orientation angle is preferably less than about 30°.

Figure 2:
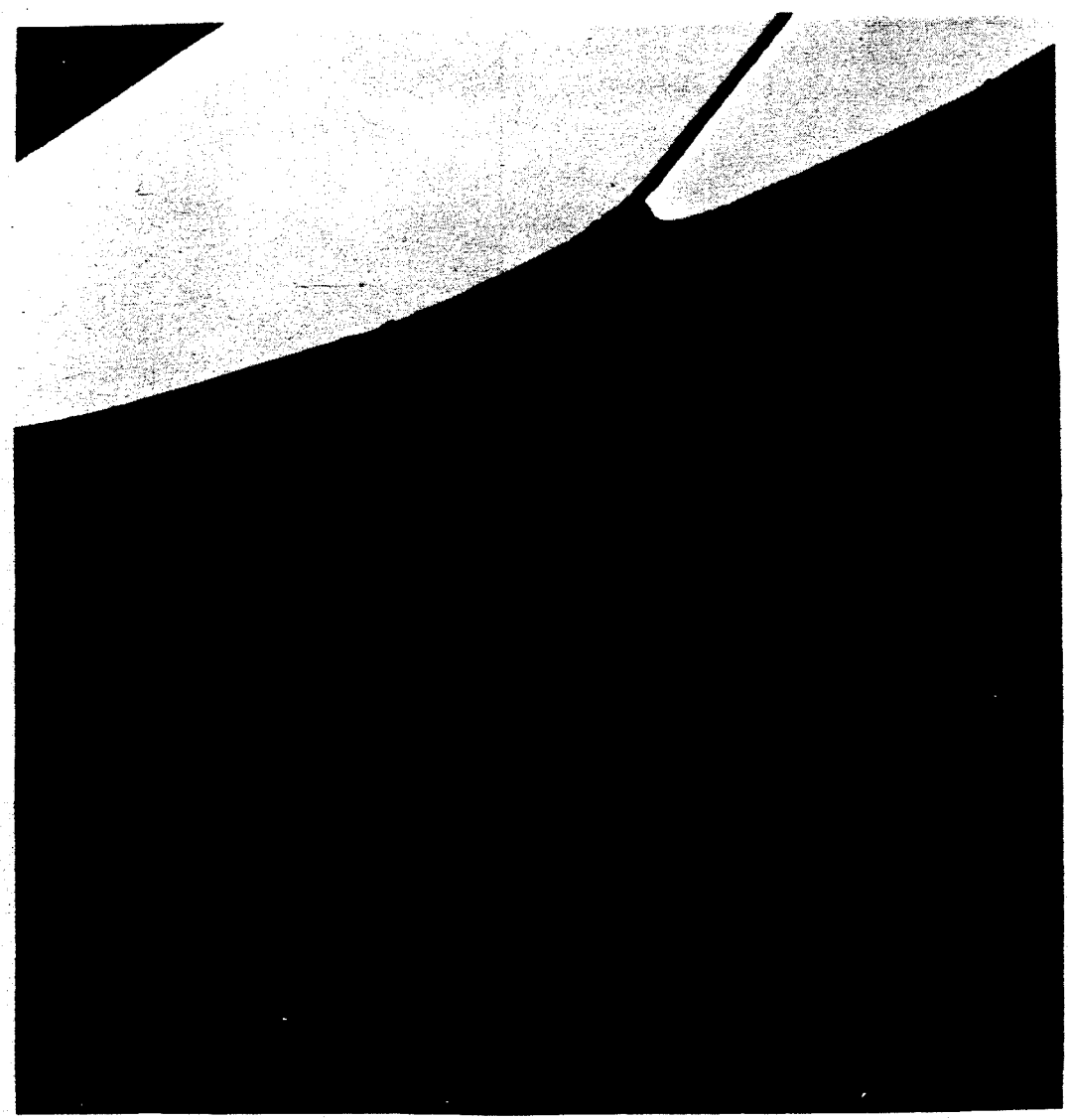
FIG. 2 is a transmission electron micrograph at 9,000× of a longitudinal section of a fiber produced in accordance with a preferred form of the present invention.

The second polymer phase containing the thermally-consolidatable polymer interpenetrates the first polymer phase throughout the article as shown in FIG. 2 which is a TEM showing the structure of fiber made by a preferred process in accordance with the invention.

The oriented shaped articles of the invention are formable into consolidated parts by the application of heat and pressure. Known techniques for "prepreg" are useful for forming consolidated parts from fibers in accordance with the invention, either by placing fibers in an appropriate mold and compressing the fibers while maintaining a temperature at or above the melting point, glass transition temperature or reaction temperature of the thermally-consolidatable polymer to form the consolidated parts. Unidirectional composites, composites containing fabrics woven from fibers of the invention, composites from discontinuous fibers can be made by such techniques. Fibers which have been pulped or fibrids can be directly made into paper by a wet-lay process. Such papers can be consolidated by heat and pressure into three dimensional composites.

In the consolidated parts, the morphology of the first polymer phase in the oriented shaped articles used to make the composite is generally preserved in the composite structure while the second phase is consolidated and becomes a somewhat continuous matrix for the first polymer phase. In general, the mechanical properties of the elongated shaped articles translate into the properties of the composites. The mechanical properties in the composites are equal to the properties predicted for short fiber reinforced composites and thus the invention provides the ability to make composites with excellent properties directly from as-spun fibers and films.

The examples which follow illustrate the invention employing the following test methods. Parts and percentages are by weight unless indicated otherwise.

Test Methods

Transmission Electron Microscopy

Transmission electron micrographs (TEM) of the cross-section and longitudinal section of the fiber were prepared using the following procedures.

Samples are prepared by first embedding a well-aligned bundle of fibers (approximately 10 filaments) in epoxy. Specimens to be cross-sectioned are most easily embedded using a BEEM size 00 capsule. A razor is used to make both a slit across the tapered tip of the capsule along a diameter and a "V" cut in the flat top of the capsule. The fiber bundle is inserted through the two cuts so that the bundle axis coincides with the capsule axis. The capsule is then filled with epoxy, the epoxy is cured overnight in a 70 degree C. oven, and the embedded fiber sample is removed from the capsule. In order to prepare specimens to be sectioned longitudinally, the two ends of a fiber bundle are taped to a TEFLON plate. A drop of epoxy is placed between the ends of the bundle and allowed to cure overnight in a 70 degree C. oven. A short segment is cut from the epoxied area and attached to the end of a Bakelite stub with epoxy.

Sections 2000 to 2500 Angstroms thick are cut from the embedded fiber specimens using a Du pont MT6000 Ultramicrotome and a diamond knife at a cutting speed of 0.7 mm/sec. In the case of cross-sections, the cutting direction is essentially perpendicular to the long axis of the fiber, and in the case of longitudinal-sections, the cutting direction is essentially parallel to the long axis of the fiber. The fiber sections are then transferred to 3 mm diameter, 200 mesh electron microscope grids.

JEOL 200CX TEM/STEM equipped with a goniometer specimen stage and operated at an accelerating potential of 200 keV is used to examine the fiber sections at the desired magnification (an objective aperature may be used to improve contrast) and the image is recorded on electron image film. The film is placed in a photographic enlarger where the recorded image is enlarged 3× and projected onto photographic film from which a positive print is made.

Tensile Properties

Yarn properties are measured at 21.1° C. and 65% relative humidity which have been conditioned under the test conditions for a minimum of 16 hours. Yarn denier is calculated by weighing a known length of yarn. The tenacity (grams/denier, gpd), elongation(%), initial modulus (gpd) as defined in ASTM D2101 are calculated from the load-elongation curves at 10% strain per minute on sample lengths of 25.4 cm and the measured yarn denier. Before each test, the yarns were twisted.

Where single filament properties are reported, tensile properties are determined similarly with a guage length of 2.54 cm for tenacity and elongation and 25.4 cm for modulus. The denier of a single filament was calculated from its fundamental resonant frequency, determined by vibrating a 4.1 cm length of fiber under tension with changing frequency (ASTM D2577 Method B).

Fiber X-ray Orientation Angle

A bundle of filaments about 0.5 mm in diameter is wrapped on a sample holder with care to keep the filaments essentially parallel. The filaments in the filled sample holder are exposed to an X-ray beam produced by a Philips X-ray generator (Model 12045B) operated at 40 kv and 40 ma using a copper long fine-focus diffraction tube (Model PW 2273/20) and a nickel beta-filter.

The diffraction pattern from the sample filaments is recorded on Kodak DEF Diagnostic Direct Exposure X-ray film (Catalogue Number 154-2463), in a Warhus pinhole camera. Collimators in the camera are 0.64 mm in diameter. The exposure is continued for about fifteen to thirty minutes (or generally long enough so that the diffraction feature to be measured is recorded at an Optical Density of ~1.0).

A digitized image of the diffraction pattern is recorded with a video camera. Transmitted intensities are calibrated using black and white references, and gray level is converted into optical density. A data array equivalent to an azimuthal trace through the two selected equatorial peaks is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak. Both peaks are measured and the Orientation Angle is taken as the average of the two measurements.

Inherent Viscosity

Inherent Viscosity (IV) is defined by the equation:

$$IV = \ln(\eta rel)/c$$

where c is the concentration (0.5 gram of polymer in 100 ml of solvent) of the polymer solution and $\eta rel$ (relative viscosity) is the ratio between the flow times of the polymer solution and the solvent as measured at 30° C. in a capillary viscometer. The inherent viscosity values reported for CTA are determined using hexafluoroisopropanol.

Domain Size in Spin Dopes

Spin dopes were examined with optical microscopy to determine the biphasic nature of these solutions. For the CTA, PAN, nitric acid solution, the dope was placed between two glass slides. The sample was pressed, using hand pressure, to facilitate a thin sample. The edges of the slides were sealed with Parafilm (TM), to prevent loss of solvent. The sample was allowed to relax overnight at room temperature.

The samples were observed with polarized and cross polarized light using a Nikon polarizing optical microscope equipped with a camera. It has been shown that static (relaxed) isotropic solutions when placed between crossed polarizing elements will transmit essentially no light. However, anisotropic dopes will transmit light and a relatively bright field is observed. Since these solutions are composed of two phases, one being isotropic and one being anisotropic, the two phases can be distinguished by comparison of observation between polarized and cross polarized light. The samples were viewed and photographed at 100x. Polariod type 57 3000 ASA film was used. Size of the isotropic domains was determined by measurement of isotropic domains on the photographs.

EXAMPLE 1

Cellulose triacetate (CTA, having an acetyl content of 43.7% and an inherent viscosity of 6.0 dl/g in hexafluoroisopropanol at 30 degrees C.) and the polyamide (a copolymer of hexamethylene diamine, bis(p-aminocyclohexyl)methane, isophthalic acid, and terephthalic acid in a 96/4/70/30 mole ratio) were dried overnight in a vacuum oven at 80 degrees C. under a nitrogen purge. An organic solvent composed of trifluoroacetic acid (TFAA) and formic acid (FA) in a 79/21 weight ratio were mixed together in a glass beaker. 65 parts by weight of the TFAA/FA solvent mixture was then added to 24.5 parts by weight of CTA in a 500 cc twin blade shear mixer. The mixer was pre-cooled to −5 degrees C. by an external refrigeration unit in order to minimize degradation of the CTA by the acid. Mixing was begun and typically continued for 2 hours in order to thoroughly wet the CTA. 10.5 parts by weight of the polyamide was then added to the mixer and mixing was continued until the next day. Occasionally the mixer was opened and a spatula was used to scrape any undissolved polymer that was stuck to the mixer walls and blades back into the rest of the spin dope. The resulting spin dope consisted of 35 weight percent polymer (70 weight percent CTA/30 weight percent polyamide) in 65 weight percent solvent (79 weight percent TFAA/21 weight percent FA). The spin dope appeared homogeneous and exhibited shear opalescence. In addition, long fibers could be pulled from the spin dope with a spatula.

The spin dope was then transferred to the spin cell and spun at room temperature and at a constant throughput rate of 0.2 ml/min through a spinneret with ten 0.005 inch diameter holes, across a 0.75 cm air-gap, and into a coagulating bath of methanol chilled to −10 degrees C. The fiber was wound up on a bobbin at a speed of 6.3 m/min resulting in a spin-stretch factor of 4. The fiber was washed continuously on the windup bobbin with water, soaked in water overnight to extract residual solvent, and subsequently air dried.

The yarn tensile strength/elongation/modulus of the as-spun composite fiber (having three twists/inch) was 4.1 gpd/5%/100 gpd. The orientation angle was 18 degrees. Examination of the cross-section of the fiber at 9000× by transmission electron microscopy (TEM) revealed interpenetrating phases of CTA and polyamide. TEM examination of a longitudinal-section of the fiber at 9000× revealed that the CTA and the polyamide were continuous along the length of the fiber.

EXAMPLE 2

Figure 3:
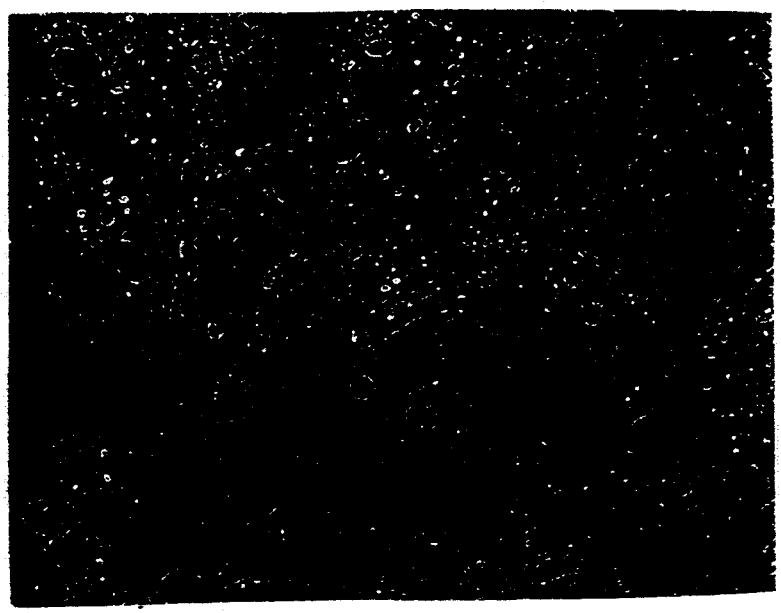
FIG. 3 is an optical micrograph in transmission of a spin dope as employed in Example 2.
Figure 4:
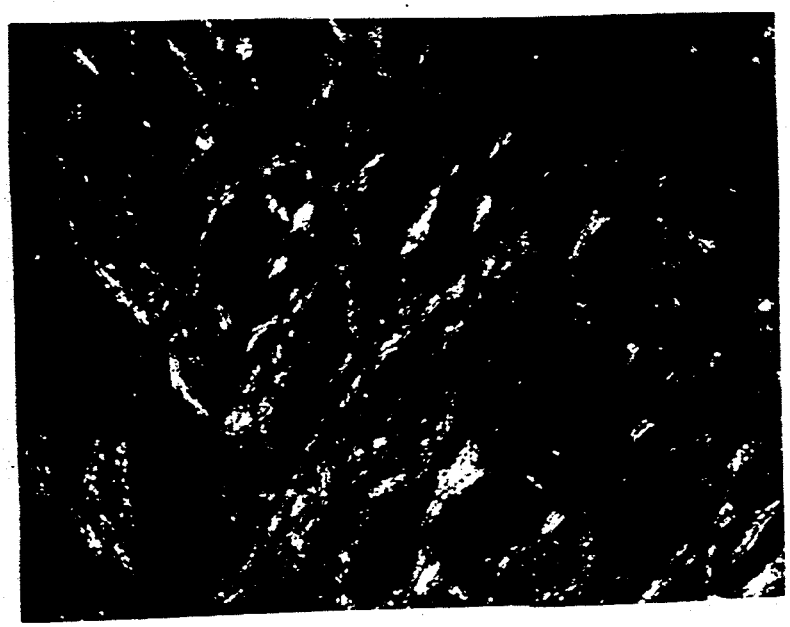
FIG. 4 is an optical micrograph as in FIG. 3 with crossed polarizers.

Cellulose triacetate (CTA, having an acetyl content of 43.7% and an inherent viscosity of 6.0 dl/g in hexafluoroisopropanol at 30 degrees C.) and polyacrylonitrile (PAN) were dried overnight in a vacuum oven at 80 degrees C. under a nitrogen purge. An inorganic solvent composed of nitric acid and water in a 87.5/12/5 weight ratio were mixed together in a glass beaker. 70 parts by weight of the aqueous nitric acid mixture was then added to 21 parts by weight of CTA and 9 parts by weight of PAN in a 500 cc twin blade shear mixer. The mixer was pre-cooled to 5 degrees C. by external refrigeration unit in order to minimize degradation of the CTA by the acid. Mixing was begun in the morning and continued until the next day. Occasionally the mixer was opened and a spatula was used to scrape any undissolved polymer that was stuck to the mixer walls and blades back into the rest of the spin dope. The resulting spin dope consisted of 30 weight percent polymer (70 weight percent CTA/30 weight percent polyacrylonitrile) in 70 weight percent solvent (87.5 weight percent nitric acid/12.5 weight percent water). The spin dope appeared homogeneous and exhibited shear opalescence. FIGS. 3 and 4 are optical micrographs of the spin dope showing that the two phases are interdispersed. The width of domains of the isotropic phase is on the order of 100–300 microns. In addition, long fibers could be pulled from the spin dope with a spatula.

The spin dope was then transferred to the spin cell while pulling vacuum to deaerate and spun at room temperature and at a constant throughput rate of 0.4 ml/min through a spinneret with ten 0.005 inch holes, across a 1 cm air-gap, and into a coagulating bath of 75/25 volume ratio methanol/water chilled to 0 degrees C. The fiber was wound up on a bobbin at a speed of 12.8 m/min resulting in a spin-stretch factor of 4. The fiber was washed continuously on the windup bobbin with water, soaked in water overnight to extract residual solvent, and subsequently air dried.

The filament tensile strength/elongation/modulus of the as-spun composite fiber was 6.1 gpd/6%/129 gpd. The orientation angle was 27 degrees. Referring to FIG. 1, examination of the cross-section of the fiber at 9000× by transmission electron microscopy (TEM) revealed isolated domains of CTA. TEM examination of a longitudinal-section of the fiber at 9000× as shown in FIG. 2 revealed that the CTA and the polyacrylonitrile were continuous along the length of the fiber.

We claim:

1. A spinnable dope consisting essentially of fiber-forming polymers in a common solvent, at least about 55% of and less than about 80% by weight of said fiber forming polymers comprising a lyotropic polysaccharide and at least about 20% and less than about 45% by weight of said fiber-forming polymers being at least one thermally-consolidatable polymer, said lyotropic polysaccharide and said thermally-consolidatable polymers being dissolved in said common solvent to form a biphasic solution having an anisotropic phase and an isotropic phase, said anisotropic and isotropic phases being interdispersed to form domains with said isotropic phase having a domain size of less than about 300 microns.

2. The spinnable dope of claim 1 wherein at least about 60% of said fiber-forming polymers is said lyotropic polysaccharide.

3. The spinnable dope of claim 1 wherein said lyotropic polymer is cellulose triacetate having an inherent viscosity of at least about 5 dl/g.

4. The spinnable dope of claim 1 wherein said thermally-consolidatable polymer is selected from the class consisting of thermoplastic polymers.

5. The spinnable dope of claim 1 wherein said thermally-consolidatable polymer is selected from the class consisting of thermoplastic polyamides.

6. The spinnable dope of claim 1 wherein said common solvent comprises a single solvent.

7. The spinnable dope of claim 1 wherein said common solvent comprises a mixed solvent.

8. The spinnable dope of claim 3 wherein said thermally-consolidated polymer is selected from the class consisting of polyarylates and said common solvent is aqueous nitric acid.

9. The spinnable dope of claim 3 wherein said thermally-consolidated polymer is selected from the class consisting of thermoplastic polyamides and said common solvent is a mixed solvent of trifluoracetic acid and formic acid.

10. The spinnable dope of claim 1 wherein said domain size of said isotropic phase is less than about 100 microns.

* * * * *